United States Patent [19]

Lee

[11] Patent Number: 4,621,221
[45] Date of Patent: Nov. 4, 1986

[54] REVERSIBLE VIBRATORY MOTOR

[75] Inventor: James K. Lee, Rochester, N.Y.

[73] Assignee: Eastman Kodak Company, Rochester, N.Y.

[21] Appl. No.: 749,033

[22] Filed: Jun. 26, 1985

[51] Int. Cl.⁴ ............................................. H02K 33/12
[52] U.S. Cl. ..................................... 318/123; 310/22; 310/33; 310/27
[58] Field of Search ................... 318/122, 123; 310/22, 310/23, 32, 33

[56] References Cited

U.S. PATENT DOCUMENTS

| 1,724,825 | 8/1929 | Chirol | 310/22 |
| 1,816,102 | 7/1931 | Waters et al. | |
| 2,451,840 | 10/1948 | Lewandowski | 74/142 |
| 2,492,860 | 12/1949 | Guajardo | 172/126 |
| 2,497,466 | 2/1950 | Olson | 172/126 |
| 2,829,530 | 4/1958 | Holden | 74/128 |
| 2,859,362 | 11/1958 | Niblick | 310/21 |
| 2,985,777 | 5/1961 | Merchant | 310/21 |
| 3,676,758 | 7/1972 | Mathews | 310/27 X |

Primary Examiner—Donovan F. Duggan
Attorney, Agent, or Firm—Donald D. Schaper

[57] ABSTRACT

A reversible vibratory motor includes a driving member responsive to a first frequency of vibration for driving a driven member in a first direction, and responsive to a second frequency of vibration for driving the driven member in the opposite direction.

9 Claims, 2 Drawing Figures

REVERSIBLE VIBRATORY MOTOR

TECHNICAL FIELD

The present invention relates to a vibratory motor and more particularly to such a motor for producing reversible motion.

BACKGROUND ART

Vibratory motors having a resilient driving element that is periodically urged into contact with a driven element to produce relative motion between the elements are well known. U.S. Pat. No. 2,451,840 discloses such a vibratory motor. Vibratory motors find application in small appliances, moving displays, etc. To enhance their usefulness, it is desirable that the motion produced by such motors be reversible. In the vibratory motor disclosed in the '840 patent, the motion is reversed by mechanically changing the angle with which the driving element makes contact with the driven element. To increase the utility of the vibratory motor in small electronically controlled appliances, it would be desirable if the direction of the motion could be controlled electronically. Furthermore, to simplify the construction of the motor it would be desirable to provide a reversible vibratory motor whereby the direction of motion can be changed without moving parts such as shift linkages.

It is therefore an object of the present invention to provide a vibratory motor capable of electronically reversible motion.

It is a further object to provide a vibratory motor capable of reversible motion which does not require mechanical shift linkages for producing a reversible motion.

DISCLOSURE OF THE INVENTION

The objects of the invention are achieved by providing a vibratory motor having a driving element responsive to a first frequency of periodic deflection for driving the driven element in a first direction, and to a second frequency of periodic deflection for driving the driven element in the opposite direction. In such a motor, having an electromechanical transducer responsive to a periodic electric signal for providing a periodic deflection of the driving element, the direction of operation of the vibratory motor is electronically reversible by changing the frequency of the periodic electrical signal.

MODES OF CARRYING OUT THE INVENTION

Figure 1:
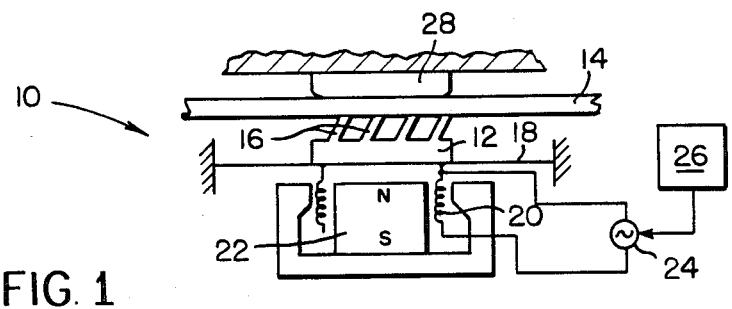
FIG. 1 is a cross-sectional view of a vibratory motor for producing electronically reversible linear motion according to the present invention.

A reversible vibratory motor for producing electronically reversible linear motion is shown in cross-section in FIG. 1. The motor, generally designated 10, includes a driving member 12 and a strip like driven member 14. The driven member 14 may comprise a moveable armature such as a flat piece of metal or plastic that functions solely as part of the motor, or a web member that normally provides another function, such as a film strip in a camera or projector, or a moveable blade member such as shutter blade in a camera. The driving member 12 comprises a plurality of parallel resilient fingers 16 formed from a material having a relatively high coefficient of frictions such as polyurethane rubber. The fingers 16 are arranged at an oblique angle to the driven member. The driving member 12 is mounted on a flexible diaphram 18 such that it can be periodically deflected by a speaker coil type drive comprising a speaker coil 20 suspended in a permanent magnetic field generated by permanent magnet 22.

A periodic driving signal is applied to the speaker coil 20 by a variable frequency oscillator 24. An electronic control circuit 26 supplies a frequency control signal to the variable frequency oscillator 24. The driven member 14 is supported between the driving member 12 and a backing plate 28 made of low friction materials such as Teflon TM.

In a first mode of operation, wherein the driving member is vibrated at a frequency below the unloaded natural resonant frequency of the fingers 16, the fingers 16 flex while they are pressed against the driven member 14, and recover to a substantially unflexed position as they move out of contact with the driven member 14. In this mode of operation, the fingers 16 flex toward the right, as seen in FIG. 1, and the driven member 14 is urged to the right by frictional contact with the fingers.

In a second mode of operation, the driving member 12 is vibrated at a frequency above the unloaded natural resonant frequency of the fingers 16. The fingers do not have time to recover to their fully extended position and they therefore contact the driving member 14 while in a flexed condition. As a result, the driven member 14 is urged to the left as seen in FIG. 1, the reverse direction from the direction of motion produced by the first mode of contact.

Therefore, the direction of motion of the vibratory motor is reversible electronically by changing the frequency of vibration imparted to the driving member.

Figure 2:
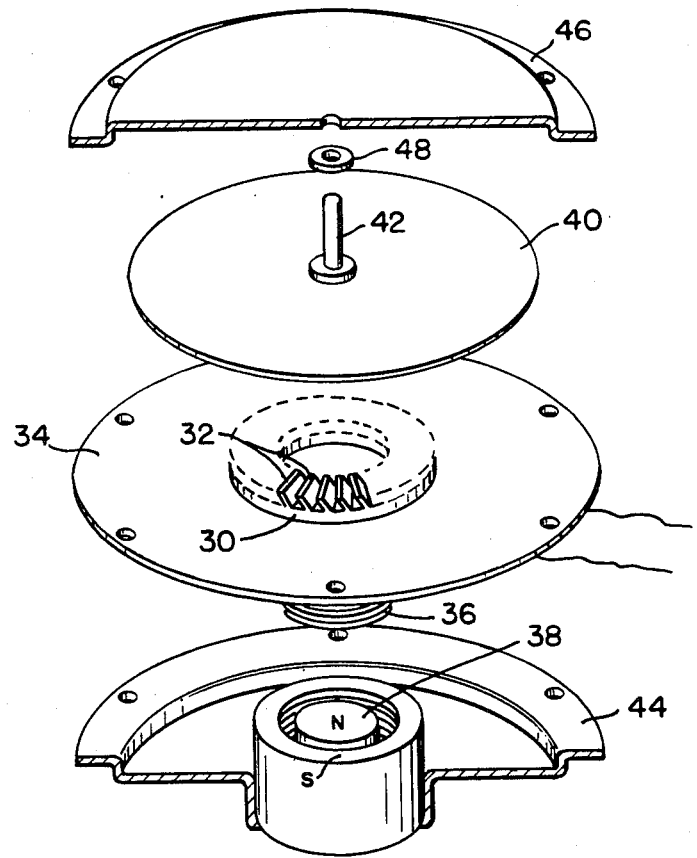
FIG. 2 is an exploded perspective view of a vibratory motor for producing electronically reversible rotational motion according to the present invention.

FIG. 2 shows a second mode of carrying out the invention. In this example, the invention is embodied in a reversible vibratory motor for producing rotary motion. A driving member 30 comprises a plurality of flexible fingers 32 arranged in a circle, and angled toward one side. The driving member 30 is carried on a flexible diaphram 34 which is driven by speaker coil drive of the type described above. The speaker coil drive includes a speaker coil 36, and a permanent magnet 38. A driven member 40 comprises a rigid disk having a axle 42. The vibratory motor is housed in a clam shell housing having bottom part 44 and top part 46 (shown broken away). A thrust washer 48 provides a low friction bearing surface for the driven member 40. In operation, when a driving signal of low frequency, below the natural resonant frequency of the fingers 32 is applied to the driving member, the vibratory motor rotates in a clockwise direction as viewed in FIG. 2. When a higher frequency driving signal, higher than the natural resonant frequency of the fingers 32, is applied to the driving member, the motor rotates in the opposite direction. Thus by varying the frequency of the periodic driving signal, an electronically reversible rotary vibratory motor is provided.

Industrial Applicability and Advantages

The electronically reversible vibratory motor according to the present invention is useful in small appliances and apparatus such as photographic cameras where a reversible motor is required. The motor is advantageous in that reversible motion can be produced electronically. The motor is further advantageous in that no separate mechanical linkages are required for reversing the motion of the motor, thereby simplifying construction of the motor and reducing its manufacturing costs.

I claim:

1. A vibratory motor for producing reversible motion, said motor having a periodically deflected driving member and a driven member adapted to be engaged by the driving member to produce relative motion therebetween, characterized in that said driving member is responsive to a first frequency of periodic deflection for driving said driven member in one direction, and said driving member is responsive to a second frequency of periodic deflection for driving said driven member in a direction opposite to said one direction.

2. The vibratory motor of claim 1 wherein said driving member is adapted to produce linear motion in said driven member, and said driving member comprises a linear array of resilient fingers arranged at an angle to a surface of the driven member.

3. The vibratory motor of claim 1 and further including a speaker coil drive means mechanically coupled to said driving member, and a variable frequency oscillator for supplying a variable frequency drive signal to said speaker coil drive means.

4. The vibratory motor of claim 1 wherein said driven member is supported by a low friction backing plate.

5. The vibratory motor of claim 1 wherein said driving member is adapted to produce reversible rotary motion in said driven member, said driving member includes a circular array of resilient fingers arranged at an angle to a surface of the driven member, and the driven member comprises a rigid disk mounted for rotation about an axis.

6. The vibratory motor of claim 5 and further including a speaker coil drive means mechanically coupled to said driving member, and a variable frequency oscillator for supplying a variable frequency drive signal to said speaker coil drive means.

7. The vibratory motor of claim 1 wherein said driving member comprises an array of resilient fingers adapted to engage a surface of said driven member.

8. The vibratory motor of claim 7 wherein said first frequency is below the natural resonant frequency of said fingers, and said second frequency is above the natural resonant frequency of the fingers.

9. The vibratory motor of claim 8 wherein said fingers are formed from polyurethane rubber.

* * * * *